Oct. 3, 1967 R. J. TURNER 3,345,519
NONLINEAR SOURCE SWITCH DRIVER
Filed Aug. 21, 1964
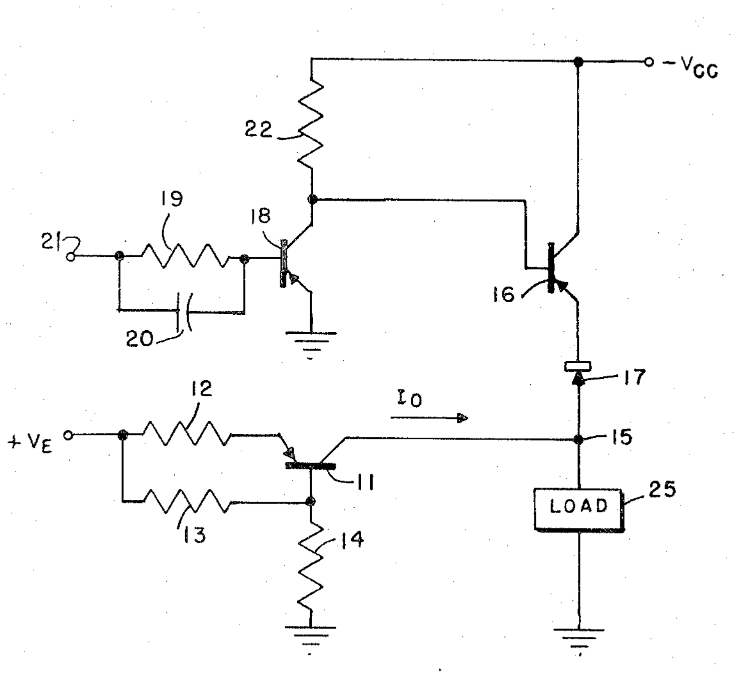
INVENTOR,
ROLAND J. TURNER
BY Harry M. Saragovitz, Edward J. Kelly, Herbert Berl & Julian C. Keppler
ATTORNEYS United States Patent Office 3,345,519

Patented Oct. 3, 1967

3,345,519

NONLINEAR SOURCE SWITCH DRIVER

Roland J. Turner, Levittown, Pa., assignor to the United States of America as represented by the Secretary of the Army Filed Aug. 21, 1964, Ser. No. 391,347
2 Claims. (Cl. 307—88.5)

ABSTRACT OF THE DISCLOSURE

A transistorized switching circuit for providing a voltage source condition when the circuit is "off" load and a current source condition when the circuit is "on" load. A transistor circuit provides a current source to an output terminal to which a load is connected. A second transistor circuit is connected between a voltage source and the output terminal. An emitter follower transistor circuit is utilized to control the conduction of the second transistor. When the emitter follower is cut-off the second transistor is conducting. When the second transistor is conducting, the current is drawn from the output terminal through the second transistor and the voltage source is connected to the output terminal through the low impedance of the second transistor. When the emitter follower is conducting, the second transistor is cut-off and the current flows to the load.

This invention relates to transistor switching circuitry and in particular to a circuit which may be switched from a voltage source to a current soure in response to an input signal.

In many applications where a nonlinear load is being driven it is desirable to have a voltage source condition when the load is cut off and a current source condition when the load is to be in a conducting state. The nonlinear source switch driver of this invention provides these conditions in the following manner. A current source is connected to an output terminal to which the switched load is to be connected. A transistor is connected between the output terminal and a voltage source. A first level of the input signal causes the transistor to conduct, connecting the voltage source to the output terminal through the low output impedance of the transistor. This causes the current from the current source to be drawn from the terminal to the source. A second level of the input signal turns the transistor off, permitting the current to flow to the load. A switch driver having these features provides the following advantages. Recovery of the switch is rapid since stray capacitance is discharged rapidly through the low impedance of the transistor, thereby insuring that the load switch is cut off rapidly. Also the current from the current source insures rapid turn-on of the load switch. This current source condition during load switch conduction is desirable from the standpoint that the operating points of the load switch are firmly established.

It is therefore an object of this invention to provide a nonlinear source switch driver which acts as a voltage source when the load switch is off and a current source when the load switch is on.

Another object of this invention is to provide a switch driver having a low recovery time and therefore a rapid switching action.

Other objects and advantages of this invention will become apparent from the following description of a preferred embodiment and reference to the accompanying drawing, the single figure of which is a schematic diagram of the nonlinear source switch driver.

A transistor 11, which is biased by a positive source $+V_E$ and resistors 12, 13 and 14, continually supplies a current $I_0$ to an output terminal 15 to which a load 25 is connected. Terminal 15 is connected to a large negative bias source, $-V_{CC}$, by way of a diode 17 and the emitter and collector electrodes of a transistor 16. The emitter of a transistor 18 is grounded while its collector is connected to the negative source $-V_{CC}$ by a resistor 22. An input terminal 21 is connected to the base of transistor 18 by the parallel combination of a resistor 19 and a capacitor 20. The collector of transistor 18 is directly connected to the base of transistor 16.

When the input gate signal at terminal 21 is at ground potential, transistor 18 is rendered non-conducting, and the resultant negative potential which appears at its collector electrode causes transistor 16 to become fully conducting. The output terminal 15 is therefore supplied with a highly negative cutoff bias through the low output impedance of transistor 16 and the diode 17. When the input gate signal goes negative, transistor 18 conducts, supplying transistor 16 with a voltage which cuts it off. During this condition the load 25 is supplied with the current $I_0$ from transistor 11. Under this latter condition transistor 16 is cut off, no longer drawing the current $I_0$ from transistor 11 as it did in the condition when the input gate signal was at ground potential. The diode 17 is used to prevent breakdown of transistor 16 during "on" load conditions. If the load is a nonlinear load, for example, a diode, the output terminal can be a few tenths of a volt positive. Under these conditions transistor 16 would conduct if its emitter were connected directly to the terminal 15 and the current would be drawn away from the load through the low impedance of the transistor.

What is claimed is:

1. A switch driver comprising: An output terminal to which a load is connected; a voltage source; a first transistor having a base electrode, a collector electrode connected to said voltage source, and an emitter electrode; a diode connected between the emitter electrode of said first transistor and said output terminal; a second transistor having a base electrode, a collector electrode connected directly to the base electrode of said first transistor, and an emitter electrode connected to a point of reference potential; an input terminal connected to the base electrode of said second transistor; a third transistor having a base electrode, a collector electrode and an emitter electrode, said third transistor providing a current source, means to connect the collector electrode of said third transistor to said output terminal; a source of positive voltage; means to connect said source of positive voltage to the emitter of said third transistor and means to connect the base of said third transistor to said source of positive voltage.

2. A switch driver comprising: an output terminal to which a load is connected; a first transistor having a base, a collector and an emitter; a diode connected between said output terminal and the emitter of said first transistor; a negative voltage source; means to directly connect said negative voltage source to the collector of said first transistor; a second transistor having a collector, a base and an emitter; a first resistor connected between said negative voltage source and the collector of said second transistor; means to directly connect the base of said first transistor to the collector of said second transistor; means to directly connect the emitter of said second transistor to ground; an input terminal; a parallel RC circuit connected between said input terminal and the base of said second transistor; a third transistor having a base, a collector and an emitter; means to directly connect the collector of said third transistor to said output terminal; a second resistor connected between the base of said third transistor and said ground; a source of positive voltage; a third resistor connected between said source of positive voltage and the emitter of said third transistor; and a fourth resistor connected between said source of positive voltage and the base of said third transistor.

References Cited

UNITED STATES PATENTS

| | | | |
|---|---|---|---|
| 2,892,952 | 6/1959 | McVey | 307—88.5 |
| 3,011,068 | 11/1961 | McVey | 328—183 |
| 3,067,340 | 12/1962 | Hodges | 307—88.5 |
| 3,124,758 | 3/1964 | Bellamy et al. | 307—88.5 |
| 3,271,590 | 9/1966 | Sturman | 307—88.5 |

OTHER REFERENCES

IBM Technical Disclosure Bulletin, "Fast Switching Inverter," by Trampel, vol. 3, No. 7, December 1960, p. 26.

ARTHUR GAUSS, *Primary Examiner.*

B. P. DAVIS, *Assistant Examiner.*